United States Patent
Mantegazza et al.

(10) Patent No.: US 6,403,514 B1
(45) Date of Patent: Jun. 11, 2002

(54) PROCESS FOR THE REGENERATION OF ZEOLITIC CATALYSTS CONTAINING TITANIUM

(75) Inventors: Maria Angela Mantegazza, Monza; Luigi Balducci, Mortara; Franco Rivetti, Milan, all of (IT)

(73) Assignee: Enichem S.p.A., San Donato Milanese (IT)

(*) Notice: Subject to any disclaimer, the term of this patent is extended or adjusted under 35 U.S.C. 154(b) by 48 days.

(21) Appl. No.: 09/690,732

(22) Filed: Oct. 18, 2000

(30) Foreign Application Priority Data

Oct. 18, 1999 (IT) .......................... MI99A2170

(51) Int. Cl.$^7$ .................... B01J 20/34; B01J 38/48
(52) U.S. Cl. .................... 502/22; 502/24; 502/25; 502/26; 502/32
(58) Field of Search ................ 502/22, 24, 25, 502/26, 32

(56) References Cited

U.S. PATENT DOCUMENTS

| 5,620,935 A | * | 4/1997 | Thiele .......................... 502/20 |
| 5,777,163 A | | 7/1998 | Mueller et al. |
| 5,859,265 A | | 1/1999 | Mueller et al. |
| 6,063,941 A | * | 5/2000 | Gilbeau ....................... 549/518 |
| 6,288,004 B1 | * | 9/2001 | Balducci et al. .............. 502/85 |

FOREIGN PATENT DOCUMENTS

| EP | 0 631 983 | 1/1995 |
| WO | WO 98/18555 | 5/1998 |

* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

A process is described for regenerating exhausted zeolitic catalysts containing titanium and deriving from oxidation processes of organic substrates with hydrogen peroxide. Said process consists in carrying out a treatment in an aqueous medium with hydrogen peroxide in the presence of inorganic fluorinated compounds, subsequent to thermal treatment of the exhausted catalyst.

16 Claims, 1 Drawing Sheet

PROCESS FOR THE REGENERATION OF ZEOLITIC CATALYSTS CONTAINING TITANIUM

Figure 1:
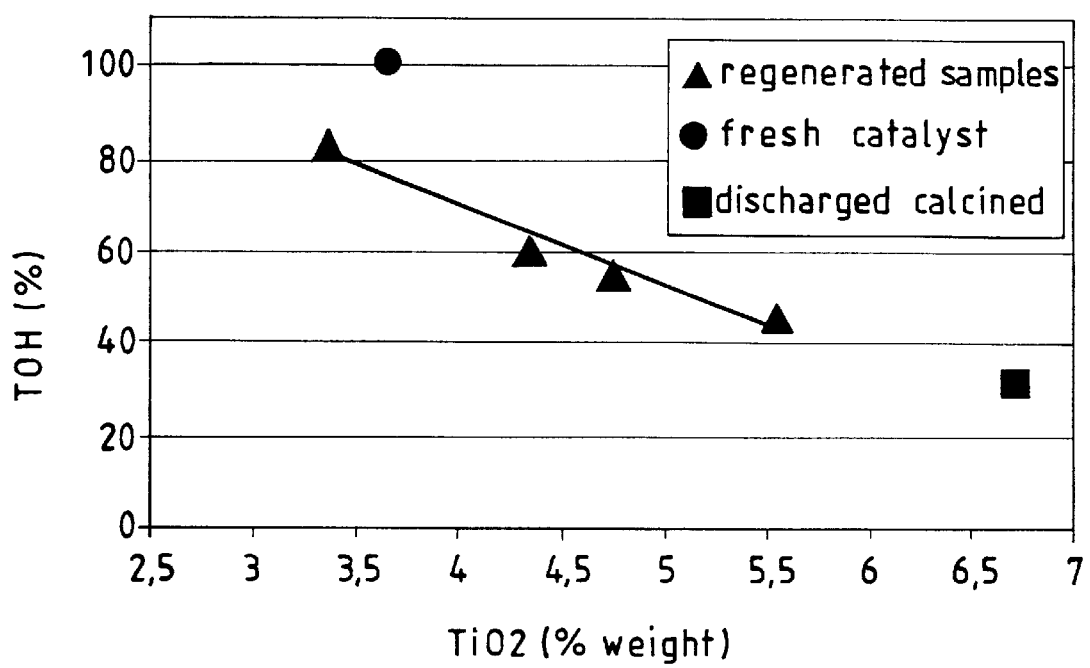

The present invention relates to a method for regenerating exhausted zeolitic catalysts containing Ti, whose catalytic performances cannot be re-established by the treatment described in the known art.

In particular, the method relates to the regeneration of exhausted catalysts consisting of microporous crystalline materials with an MFI-type structure containing titanium and originally having a composition corresponding to formula (I):

$$xTiO_2 \cdot (1-x)SiO_2 \qquad (I)$$

wherein x ranges from 0.0001 and 0.04 and preferably from 0.01 to 0.03.

Catalysts having general formula (I) can be prepared according to the methods described in U.S. Pat. No. 4,410,501 and, in the form of microspheres with a high crushing strength, in U.S. Pat. Nos. 4,954,653 and 4,701,428.

The properties and main applications of said compounds (titanium silicalites, TS-1) are well known in the art (B. Notari; Structure-Activity and Selectivity in Heterogeneous Catalysis; R. K. Grasselli and A-W. Sleight Editors; Elsevier; 1991; pages 243–256).

These catalysts are typically used in direct oxidation reactions with hydrogen peroxide of organic substrates, such as aromatic hydrocarbons (U.S. Pat. No. 4,369,783), olefins (EP 100,119), alcohols (U.S. Pat. No. 4,480,135), nitrogenated compounds (U.S. Pat. No. 4,918,194; U.S. Pat. No. 5,320,819) and in ammoximation reactions of carbonyl compounds (U.S. Pat. No. 4,794,198; EP 496,385).

The deterioration in the catalytic performances of titanium silicalites, after a more or less prolonged use in the above reactions, can be caused by many factors; for example, it may be due to impurities present in the reagents or migrating from the equipment or to reaction by-products which accumulate in the micropores of the material.

The most well known method in the art for regenerating exhausted zeolitic catalysts consists in subjecting them to thermal treatment under controlled gaseous stream (air, nitrogen/air) and temperature conditions; for example, said treatment can be carried out at temperatures ranging from 500 to 800° C. first in a stream of nitrogen and then in air.

In another process (WO 98/18556), preferably applied to the TS-1 used in epoxidation reactions of olefins and allyl chloride, the thermal treatment is carried out at temperatures lower than 400° C.

The regeneration of catalysts by thermal treatment alone, however, is not very effective if the deactivation of the zeolitic material is caused, for example, by impurities which are difficult to eliminate by combustion with air or caused by more or less marked alterations in the composition and/or structure.

In these cases, in order to avoid the substitution of the catalyst and consequent rise in costs, resort is made to chemical regeneration methods.

Italian patent application 22413 A/89 describes a method for regenerating titanium silicalites, which consists in effecting a treatment with a nitrogenated organic base under hydrothermal conditions, preferably in the presence of an acid selected from citric acid, tartaric acid and formic acid, subsequent to the thermal treatment.

In the patent (WO 98/18555), the treatment of titanium silicalite is carried out with aqueous or organic solutions of oxidizing agents preferably selected from hydrogen peroxide, ozone and organic peroxide compounds; this method is particularly suitable for the regeneration of TS-1 used in epoxidation processes of olefins, the hydroxylation of aromatic compounds and the oxidation of saturated hydrocarbons.

A process has now been found which allows the regeneration of exhausted catalysts, originally having general formula (I), whose catalytic performances cannot be re-established by thermal treatment alone.

In particular, the object of the present invention relates to a process for the regeneration of exhausted catalysts consisting of microporous crystalline materials with an MFI-type structure containing titanium and having a composition corresponding to formula (I):

$$xTiO_2 \cdot (1-x)SiO_2 \qquad (I)$$

wherein x ranges from 0.0001 to 0.04 and preferably from 0.01 to 0.03, which consists in subjecting the catalyst, previously calcined, to a treatment in an aqueous medium with hydrogen peroxide, in the presence of fluorinated inorganic compounds.

The process is generally carried out within a pH range of 3.5 to 4.5 and at temperatures ranging from 50 to 100° C.

The process of the present invention, although being generally valid for the regeneration of exhausted catalysts coming from oxidation processes of organic substrates with hydrogen peroxide, typical of titanium silicalite (TS-1), has proved to be particularly useful for regenerating catalysts deriving from the oxidation of nitrogenated basic compounds such as, for example, secondary amines (U.S. Pat. No. 4,918,194) and ammonia (U.S. Pat. No. 5,320,819) or ammoximation reactions of carbonyl compounds, such as for example, cyclohexanon (U.S. Pat. No. 4,794,198; EP 496,385).

The deterioration in the activity of TS-1 in the above reactions is known in literature (G. Petrini et al., Deactivation Phenomena on Ti-silicalite; Catalyst Deactivation 1991; C. H. Bartholomew, J. B. Butt (Editors); Elsevier 1991, pages 761–766).

It is caused by the combination of three main phenomena consisting: a) in the gradual dissolution of the structure with the accumulation of Ti on the surface of the solid; b) in the removal of the Ti from the structure and c) in the filling of the pores with reaction by-products. As a result of these phenomena, the Ti-silicalite undergoes a progressive alteration in the composition and structure which, as the reaction proceeds, leads to a gradual loss in activity until a level is reached which is unacceptable for the economy of the process. This normally takes place when the catalyst, from a chemical point of view, has a Ti content which is significantly higher than the initial content (for example 1.5–2 times higher).

In spite of this considerable alteration in composition, when the regeneration method, object of the present invention, is applied to the above exhausted catalysts, it surprisingly allows at least 80% of the initial catalytic activity to be recuperated, which greatly benefits the economy of synthesis processes.

The regeneration method, object of the present invention, preferably relates to exhausted catalysts based on Ti-silicalites coming from oxidation reactions of nitrogenated basic compounds or the ammoximation of carbonyl compounds, said materials being characterized by a molar ratio Ti/Si higher than that of fresh catalysts having general formula (I). The regeneration method, carried out on the exhausted material previously subjected to thermal treatment according to the known art, basically consists in a dissolution reaction of Ti; this is effected at temperatures preferably ranging from 60 to 90° C. in an aqueous medium with hydrogen peroxide in the presence of fluorinated inorganic compounds.

This reaction can be carried out by initially preparing a suspension of the calcined catalyst, for example from 5 to 15% by weight, in the aqueous solution of the reagents (hydrogen peroxide, fluorinated compound) and then thermostat-regulating at the selected temperature. According to another embodiment of the method, the hydrogen peroxide can be added to the suspension of the catalyst in the solution of fluorinated compound, already thermostat-regulated; furthermore, the dosing of hydrogen peroxide can be effected by a single addition or several additions over a period of time.

The fluorinated compounds useful for the purposes of the present invention can be selected from hydrofluoric acid, ammonium fluorides or fluorides of alkaline metals; in addition inorganic fluoroderivatives soluble in water can be used, in acid form such as, for example, fluosilicic and fluorboric acids, or in salified form with $NH_4OH$.

Among the above fluorinated compounds, ammonium derivatives are preferred; ammonium fluoride ($NH_4F$) and difluoride ($NH_4HF_2$) are particularly preferred.

Hydrogen peroxide in aqueous solution at 30% by weight is typically combined with the fluorinated compounds.

The concentration of reagents in the reaction medium is defined in relation to the concentration and chemical composition of the exhausted catalyst. As specified above, controlling the dissolution reaction of Ti is the critical point of the regeneration method, object of the present invention; in the case of exhausted materials characterized by Ti/Si molar ratios higher than those of fresh catalysts, the concentration of the reagents and the operating conditions (temperature and treatment time) are defined so as to approximately re-establish the original chemical composition.

It has been observed, in fact, that a continuous recovery of the catalytic activity of the materials corresponds to a progressive dissolution of Ti in the reaction medium. This effect is illustrated in FIG. 1 which relates to the series of regeneration tests of an exhausted catalyst deriving from the synthesis of cyclohexanone-oxime (CEOX) from cyclohexanone; this Figure indicates the turn-over values (TOH= CEOX moles/Ti moles-hour) in relation to the $TiO_2$ content in the regenerated catalysts.

The recovery of at least 80% of the catalytic activity takes place in correspondence with the chemical compositions more or less the same or slightly lower than that of the fresh catalyst.

In accordance with this trend, the treatment conditions should therefore be established each time in order to control the dissolution degree of Ti within a suitable range of values. For example, in the case of the regeneration of exhausted catalysts coming from oxidation processes of nitrogenated compounds or the ammoximation of carbonyl compounds and normally characterized by a Ti content approximately double of that of fresh catalyst, the treatment conditions are selected so as to dissolve about 50% of Ti.

The quantity of reagents (fluoride, hydrogen peroxide) is usually dosed in relation to the Ti content (in moles) in the exhausted catalyst. Expressing the concentration of the fluorinated compound in moles of F, the molar ratio F/Ti can vary from 1.0 to 3.5; under the preferred conditions in which ammonium fluoride or difluoride are used, this ratio normally ranges from 1.5 to 3.0.

With respect to the dosage of hydrogen peroxide, it should be noted that this is also influenced by the catalytic activity of the exhausted material in the decomposition reaction of $H_2O_2$. This reagent, in fact, as well as participating in the dissolution reaction of Ti in the form of peroxide compound, is subject to degradation due to the zeolitic Ti. Under the operating conditions of the process, object of the present invention, the quantity of hydrogen peroxide used is such that the molar ratio $H_2O_2$/(soluble Ti) in the mother liquor at the end of the reaction, is at least equal to 1.0 and is preferably higher than 2.0. This implies an initial molar dosage of $H_2O_2$/Ti varying from 5.0 to 30; under the preferred conditions in which ammonium fluoride or difluoride are used, this ratio normally ranges from 10 to 25.

The regeneration reaction is conveniently carried out at a temperature ranging from 50 to 100° C., preferably from 60 to 90° C. and with residence times, under constant temperature conditions, ranging from 1 to 6 hours.

At the end of the treatment, the catalyst is separated from the reaction medium and washed repeatedly with deionized water.

The material is then dried, for example, at a temperature of 110–120° C.; the drying can also be followed by a thermal treatment in air at a temperature of 400 to 600° C. to ensure the complete removal of possibly absorbed ions, such as the ammonium ion, for example.

Some examples are provided hereunder relating to the regeneration, according to the method of the present invention, of an exhausted catalyst based on Ti-silicalite and coming from the synthesis of cyclohexanone-oxime (CEOX).

The catalysts treated according to the examples were then subjected to a catalytic activity test in the ammoximation reaction of cyclohexanone with ammonia in the presence of hydrogen peroxide.

EXAMPLE 1

An exhausted catalyst based on titanium silicalite, deriving from an industrial plant for the production of cyclohexanone-oxime (CEOX) from cyclohexanone, ammonia and hydrogen peroxide and prepared according to U.S. Pat. No. 4,701,428, is subjected to regeneration by means of thermal treatment: 100 g of exhausted catalyst are heated in a stream of air at 550° C. and left under these conditions for 6 hours. Catalyst titer (weight % $TiO_2$)=6.73.

The fresh catalyst had a titer of $TiO_2$ equal to 3.69%.

EXAMPLE 2

13 g (about 11 mmoles of Ti) of the catalyst of example 1 and 0.47 g of $NH_4HF_2$ in 140 g of deionized water, corresponding to a molar ratio F/Ti=1.5, are charged into a 250 ml glass flask, equipped with a mechanical stirrer, reflux condenser, thermometer and heating jacket. The aqueous suspension of the catalyst, maintained under mechanical stirring, is heated to 60° C.; 7.3 g of an aqueous solution at 30% (by weight) of $H_2O_2$, equal to a molar ratio $H_2O_2$/Ti= 5.85 are subsequently added and the suspension is kept under stirring at 60° C. for 4 hours. At the end of the treatment, the solid is separated by filtration from the mother liquor, which is yellow-coloured due to the presence of peroxide species of Ti, repeatedly washed with deionized water and dried at 110° C. The catalyst is finally subjected, at a heating rate of 50° C./h, to thermal treatment in air at 550° C. for 4 hours.

Catalyst titer (weight % $TiO_2$)=5.55.

EXAMPLE 3

13 g of the catalyst of example 1 and 0.84 g of $NH_4F$ in 140 g of deionized water, equivalent to a molar ratio F/Ti=2.06, are charged into the reactor. After heating to 80° C., 13.5 g of the $H_2O_2$ solution at 30% by weight are added (molar ratio $H_2O_2$/Ti=10.8 and the suspension is maintained under stirring at 80° C. for 1 hour. The procedure of example 2 is then followed.

Catalyst titer (weight % $TiO_2$)=4.76.

EXAMPLE 4

13 g of the catalyst of example 1 and 0.85 g of $NH_4HF_2$ in 140 g of deionized water, equivalent to a molar ratio F/Ti=2.71, are charged into the reactor. The suspension is heated to 60° C., a first addition of 7.3 g is then effected, followed by a second addition, after 2.5 hours at 60° C., of 7.3 g of the $H_2O_2$ solution (30% by weight). The heating is continued for 1.5 hours and the procedure of example 2 is then followed.

Catalyst titer (weight % $TiO_2$)=4.35.

EXAMPLE 5

13 g of the catalyst of example 1 and 0.84 g of $NH_4F$ in 140 g of deionized water, equivalent to a molar ratio F/Ti=2.06, are charged into the reactor. The suspension is heated to 80° C., a first addition of 13.5 g is then effected, followed by a second addition, after 4 hours at 80° C., of 13.5 g of the $H_2O_2$ solution (30% by weight). The heating is continued for 1 hour and the procedure of example 2 is then followed.

Catalyst titer (weight % $TiO_2$)=3.38.

EXAMPLES 6–11

The samples of examples 1–5 were subjected to a catalytic activity test in the synthesis reaction of cyclohexanone-oxime (CEOX) from cyclohexanone and ammonia in the presence of hydrogen peroxide.

0.75 g of catalyst, 25 g of an aqueous ammonia solution (15% by weight, 0.21 moles), 25 ml of terbutanol and 9.81 g of cyclohexanone are charged into a glass reactor, equipped with a stirrer and heating jacket, into which an inert gas (helium) has been previously pumped.

The suspension is brought to 75° C., and an aqueous solution of $H_2O_2$ at ?% by weight is fed, under stirring, over a period of 50 minutes.

At the end of the reaction, the suspension is filtered and the solution is analyzed via chromatography.

The results, compared with those obtained using the fresh synthesis catalyst (example 6), are provided in Table 1 below, which indicates the hourly turn-over, TOH=CEOX moles/(Ti moles.hour), of each sample and the TOH % percentage with respect to the TOH of the fresh catalyst.

TABLE 1

| Example Nr. | Sample Nr. | Sample titer (% $TiO_2$) | TOH | TOH (%) |
|---|---|---|---|---|
| 6 | Fresh catalyst | 3.69 | 313 | 100 |
| 7 | 1 | 6.73 | 98 | 31 |
| 8 | 2 | 5.55 | 143 | 46 |
| 9 | 3 | 4.76 | 172 | 55 |
| 10 | 4 | 4.35 | 188 | 60 |
| 11 | 5 | 3.38 | 261 | 84 |

Sample 1, only thermally treated, gives much lower results with respect to the fresh catalyst. On subjecting sample 1 to treatment with ammonium fluoride or difluoride in the presence of $H_2O_2$ in order to dissolve increasing quantities of Ti (samples 2, 3, 4, 5), the catalyst progressively recuperates its activity, recovering over 80% of the initial value (sample 5).

EXAMPLE 12

Example 4 is repeated but operating with ammonium difluoride alone ($NH_4HF_2$).

Catalyst titer (weight % $TiO_2$)=5.64.

EXAMPLE 13

Example 5 is repeated but operating with ammonium fluoride alone ($NH_4F$).

Catalyst titer (weight % $TiO_2$)=6.25.

EXAMPLES 14–16

The samples of examples 12 and 13 were subjected to the catalytic activity test carried out under the conditions of example 6.

The results, compared with those provided by the samples treated under analogous conditions in the presence of $H_2O_2$ (values in brackets) are indicated in Table 2 below.

TABLE 2

| Example Nr. | Example Sample Nr. | Catalyst titer (% $TiO_2$) | TOH CEOX moles/Ti moles hr. |
|---|---|---|---|
| 14 | 12 | 5.64 (4.35) | 137 (188) |
| 15 | 13 | 6.25 (3.38) | 108 (261) |

What is claimed is:

1. A process for the regeneration of exhausted catalysts consisting of microporous crystalline materials with an MFI-type structure containing titanium and originally having a composition corresponding to formula (I):

$$xTiO_2 \cdot (1-x)SiO_2 \qquad (I)$$

wherein x ranges from 0.0001 to 0.04, which consists of subjecting the exhausted catalyst, previously calcined, to a treatment in an aqueous medium with hydrogen peroxide, in the presence of fluorinated inorganic compounds.

2. The process according to claim 1, wherein the treatment is carried out within a pH range of 3.5 to 4.5, at temperatures ranging from 50 to 100° C. and with times ranging from 1 to 6 hours.

3. The process according to claim 2, wherein the treatment is carried out at temperatures ranging from 60 to 90° C.

4. The process according to claim 1, wherein the quantity of reagents is dosed so that the molar ratio F/Ti ranges from 1.0 to 3.5.

5. The process according to claim 4, wherein the molar ratio F/Ti ranges from 1.5 to 3.0.

6. The process according to claim 1, wherein the initial molar ratio between $H_2O_2$ and the titanium content in moles of the catalyst ranges from 5.0 to 30.

7. The process according to claim 6, wherein the initial molar ratio $H_2O_2$/Ti varies from 10 to 25.

8. The process according to claim 1, wherein the catalyst, at the end of the treatment, is separated from the reaction medium, washed with deionized water, dried at a temperature of 110–120° C. and optionally subjected to thermal treatment in air at 400 to 600° C.

9. The process according to claim 1, wherein the inorganic fluorinated compounds are selected from the group consisting of hydrofluoric acid, fluorides of ammonium or alkaline metals, inorganic fluoro-derivatives soluble in water, in acid form or in salified form with $NH_4OH$.

10. The process according to claim 9, wherein the inorganic fluorinated compounds are ammonium fluoride or difluoride.

11. The process according to claim 1, wherein the exhausted catalysts derive from oxidation processes of organic substrates with hydrogen peroxide and are characterized by a molar ratio Ti/Si higher than that of fresh catalysts having general formula (I).

12. The process according to claim 11, wherein the exhausted catalysts derive from the oxidation of nitrogenated basic compounds or from ammoximation reactions of carbonyl compounds.

13. The process according to claim 12, wherein the nitrogenated organic compounds consist of secondary amines or ammonia and the carbonyl compounds of cyclohexanone.

14. The process according to claim 1, wherein the treatment is carried out by suspending the catalyst, previously calcined, in the aqueous medium with hydrogen peroxide and the inorganic compounds, at a concentration ranging from 5 to 15% by weight, and then thermostat-regulating at the selected temperature.

15. The process according to claim 1, wherein the treatment is carried out by suspending the catalyst, previously calcined, in the aqueous medium with the inorganic compounds, at a concentration ranging from 5 to 15% by weight, and then adding hydrogen peroxide by means of a single addition or various additions over a period of time.

16. The process according to claim 1 wherein the value of x ranges from 0.01 to 0.03.

* * * * *